(12) United States Patent
Howard

(10) Patent No.: US 11,211,175 B2
(45) Date of Patent: Dec. 28, 2021

(54) HYDRODYNAMIC PIN FOR CENTERING A NUCLEAR REACTOR CORE

(71) Applicant: Electricite de France, Paris (FR)

(72) Inventor: Richard Howard, Paris (FR)

(73) Assignee: Electricite de France

( * ) Notice: Subject to any disclaimer, the term of this patent is extended or adjusted under 35 U.S.C. 154(b) by 0 days.

(21) Appl. No.: 16/628,752

(22) PCT Filed: Jul. 6, 2018

(86) PCT No.: PCT/EP2018/068429
§ 371 (c)(1),
(2) Date: Jan. 6, 2020

(87) PCT Pub. No.: WO2019/008165
PCT Pub. Date: Jan. 10, 2019

(65) Prior Publication Data
US 2020/0143949 A1    May 7, 2020

(30) Foreign Application Priority Data

Jul. 6, 2017 (FR) ........................ 1756372

(51) Int. Cl.
*G21C 5/10* (2006.01)
*G21C 13/024* (2006.01)
(Continued)

(52) U.S. Cl.
CPC ............ *G21C 5/10* (2013.01); *G21C 13/024* (2013.01); *G21C 15/12* (2013.01); *G21C 15/00* (2013.01); *G21C 19/19* (2013.01)

(58) Field of Classification Search
CPC ........ G21C 5/10; G21C 13/024; G21C 15/12; G21C 15/00; G21C 19/19
(Continued)

(56) References Cited

U.S. PATENT DOCUMENTS 3,027,143 A    3/1962  Ferguson et al.
3,178,355 A    4/1965  Jacobs
(Continued)

FOREIGN PATENT DOCUMENTS

DE    19536443 A1    4/1997
EP      566863 A1   10/1993
(Continued)

OTHER PUBLICATIONS

French Search Report for Application No. FR1756372, dated Feb. 26, 2018, pp. 1-2.
(Continued)

*Primary Examiner* — Jack W Keith
*Assistant Examiner* — Daniel Wasil
(74) *Attorney, Agent, or Firm* — Lerner, David, Littenberg, Krumholz & Mentlik, LLP

(57) ABSTRACT

A centering pin for a nuclear reactor core within a reactor vessel includes a central part having a radially inner edge oriented toward the core and a horizontal thickness along the radially inner edge. The pin includes an upper hydrodynamic profile, which is disposed above the central part and forms a vertical wing leading edge extending from the central part and having an upper height above the central part. The pin includes a lower hydrodynamic profile, which is disposed below the central part and forms a vertical wing trailing edge extending from the central part and having a lower height below the central part. The upper height has a maximum variation of more or less 25% relative to the horizontal thickness. The lower height has a maximum variation of more or less 25% relative to the horizontal thickness.

7 Claims, 5 Drawing Sheets

(51) Int. Cl.
*G21C 15/12* (2006.01)
*G21C 19/19* (2006.01)
*G21C 15/00* (2006.01)

(58) Field of Classification Search
USPC .............................. 376/302, 303, 347, 461
See application file for complete search history.

(56) References Cited

U.S. PATENT DOCUMENTS

| | | | |
|---|---|---|---|
| 5,118,467 A | | 6/1992 | Lippert et al. |
| 5,143,691 A | | 9/1992 | Lippert et al. |
| 5,302,068 A | * | 4/1994 | Janusz ................ B25B 23/00 411/402 |
| 5,550,883 A | | 8/1996 | Bougis |
| 5,793,828 A | * | 8/1998 | Wivagg ................ G21C 5/10 376/302 |
| 5,864,594 A | * | 1/1999 | Balog ................ G21C 13/02 376/302 |
| 6,377,538 B1 | | 4/2002 | d'Alayer de Costemore d'Arc |
| 2009/0052606 A1 | | 2/2009 | Gilmore et al. |
| 2010/0034337 A1 | | 2/2010 | Verdier et al. |
| 2013/0272479 A1 | | 10/2013 | Lee et al. |
| 2015/0227132 A1 | * | 8/2015 | Graf ................ G01B 11/002 700/114 |

FOREIGN PATENT DOCUMENTS

| | | |
|---|---|---|
| EP | 712138 A1 | 5/1996 |
| EP | 1003171 A1 | 5/2000 |
| EP | 1003177 A1 | 5/2000 |
| EP | 1280163 A1 | 1/2003 |
| EP | 2366184 B1 | 1/2015 |
| GB | 911704 A | 11/1962 |
| RU | 2256243 C2 | 7/2005 |

OTHER PUBLICATIONS

International Search Report from Application No. PCT/EP2018/068429 dated Sep. 14, 2018, 2 pages.

* cited by examiner

State of the art

State of the art

State of the art

State of the art

HYDRODYNAMIC PIN FOR CENTERING A NUCLEAR REACTOR CORE

CROSS-REFERENCE TO RELATED APPLICATIONS

The present application is a national phase entry under 35 U.S.C § 371 of International Application No. PCT/EP2018/068429 filed Jul. 6, 2018, which claims priority from French Application No. 1756372 filed Jul. 6, 2017, all of which are hereby incorporated herein by reference.

TECHNICAL FIELD

The present invention relates to the field of reactor vessels of nuclear power plants.

The present invention relates more specifically to improved centering pins for centering reactor cores in the nuclear reactor vessels.

The present invention particularly applies to all reactors of the pressurized-water nuclear power plants of second or third generation, for which the core is cooled using a heat transfer fluid circulating through the core.

STATE OF THE ART

The general structure of nuclear power plants is known to those skilled in the art.

This general structure is illustrated in the appended FIG. 1 which shows the vessel 10 housing a core 20.

Such a power plant comprises a primary circuit 30 and a secondary circuit 40.

The heat produced by the fission of an enriched material in the core 20 of the reactor heats up the pressurized water of the primary circuit 30. The heat from the primary circuit 30 evaporates the water from the secondary circuit 40 on passage through a steam generating exchanger 42. A turbine-generator set 60, 62 converts the mechanical power of the steam into electrical power.

FIG. 1 furthermore schematically represents in 22 control rods, in 32 a pressurizer, in 34 a primary pump, in 12 a sealed enclosure, in 64 a condenser and in 66 an extraction pump.

In a conventional manner per se, as illustrated in the appended FIG. 2, taken from document EP-1003171, the core 20 is centered in the vessel 10 by centering pins 100.

Thanks to this structure, before entering the plenum, i.e. the lower part 13 of the vessel, the cooling water (heat transfer fluid) flows into the annular space 11 defined between the shell 20 of the core and the outer wall 10 of the vessel. The cooling water which flows around the centering pins 100 and enters the plenum 13 is then redirected toward the core 20 through a bottom plate 14 of the core.

Figure 3:
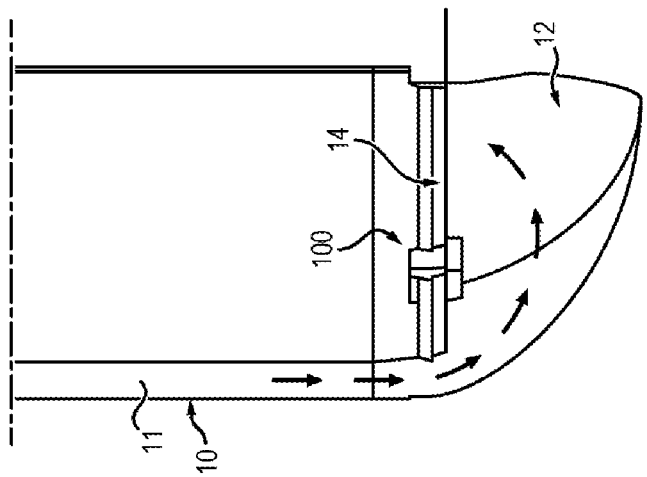
FIG. 3 represents a partial view in vertical section of the lower part of a known vessel 10 and particularly illustrates centering pins 100.

In FIG. 3, the arrows designate the progress of cooling water in the annular space 11 then in the plenum 13.

Figure 4:
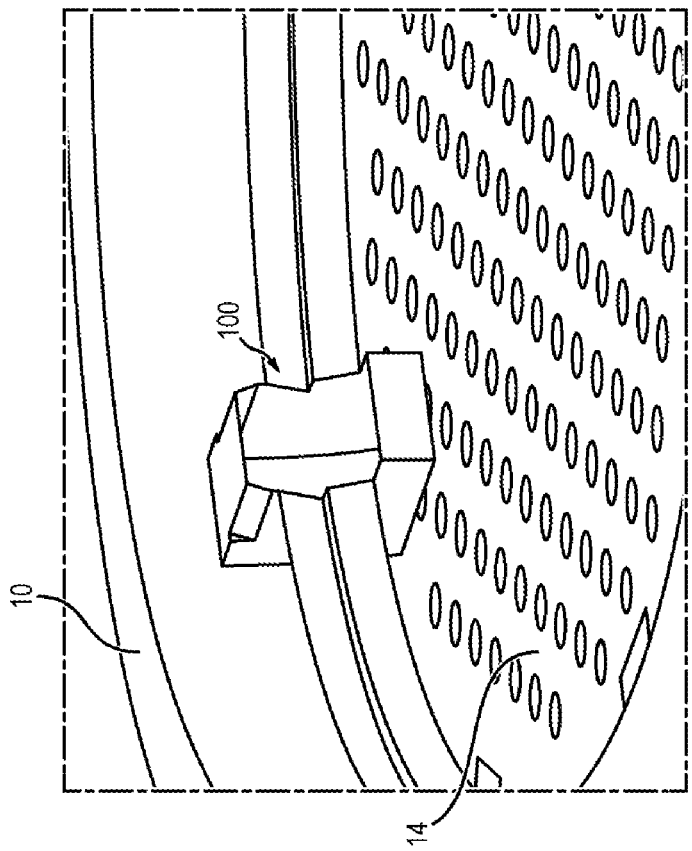
FIG. 4 represents a view at an enlarged scale of such a centering pin 100 in accordance with the state of the art.

As can be seen in FIGS. 3 and 4, the pins 100 known in the related art are of vertical and horizontal square section. Therefore, they have a general shape of a rectangular parallelepiped.

The inventors have observed that the shape of these known centering pins 100 disturbs the flow of the cooling water injected into the plenum 13 of the vessel bottom. The thus generated instabilities contribute to the heterogeneity of the core 20 cooling flow and have a strong impact on the heat and neutron exchanges of the assembly.

A heterogeneous flow at the inlet of the core 20 modifies the operation of the core. Therefore, there is an impact on the heat and neutron exchanges of the assembly, on the mechanical loads and thus a negative effect on the efficiency and the lifetime of an assembly.

The heat exchange between the water and the assemblies of the core depends on the flow rate. A high flow rate creates a strong heat transfer.

At the same time, the water acts as a moderator for the neutron reaction. A strong flow rate of the water increases the intensity of the neutron reaction and thus increases the fuel consumption and the temperature of the assembly.

When the distribution of the flow rate layer varies between neighboring assemblies, there is a temperature differential between the assemblies. The temperature induces a mechanical deformation (expansion) of the assembly and temperature differences between neighboring assemblies can cause mechanical loads. These mechanical loads can damage an assembly or set of assemblies.

A very heterogeneous flow rate layer at the inlet of the core has therefore an impact on the heat and neutron exchanges of the assembly, on the mechanical loads and thus a negative effect on the efficiency and the lifetime of an assembly.

Attempts to solve the problem thus posed have already been proposed.

For example, it has been proposed to add structures in the vessel bottom 13. However, the most effective shapes have a lot of space requirement for the flow and the pressure loss of the primary circuit 30 is increased. This requires a re-dimensioning of the pumps of the primary circuit 30. This is a significant change in the design of a nuclear power plant.

In conclusion, none of the solutions proposed so far is totally satisfactory.

Problem Posed

The object of the present invention is to improve the state of the art.

A first object of the invention is to improve the hydrodynamics of the fluid flow of the primary circuit in the core of a nuclear power plant.

Another object of the invention is to propose solutions without imposing significant changes to the design of a nuclear power plant.

Base of the Invention

The aforementioned objects are achieved within the framework of the present invention thanks to the profiling of the centering pins for centering a core of a nuclear power plant in a reactor vessel. The profiling is characterized by a hydrodynamic profile on the upstream and downstream faces of the pin to reduce instabilities when the coolant is circulating around the pin and by the fact that the height of the upper hydrodynamic profile located upstream in the direction of flow of the fluid is in the order of magnitude of the horizontal thickness of the pin.

According to other advantageous characteristics of the invention:
hydrodynamic profiles are provided on the upstream face and on the downstream face of the pin, the height of the hydrodynamically-profiled lower part is in the order of magnitude of twice the horizontal thickness of the pin, the upper hydrodynamic profile has a general shape of a dihedral, the lower hydrodynamic profile has a shape of a pyramid, the lower hydrodynamic profile extends up to the vessel bottom.

The present invention also relates to a reactor vessel of a nuclear power plant equipped with a plurality of centering pins of the aforementioned type.

The present invention also relates to reactors of nuclear power plants including such a vessel and such pins.

QUICK DESCRIPTION OF THE FIGURES

Figure 1:
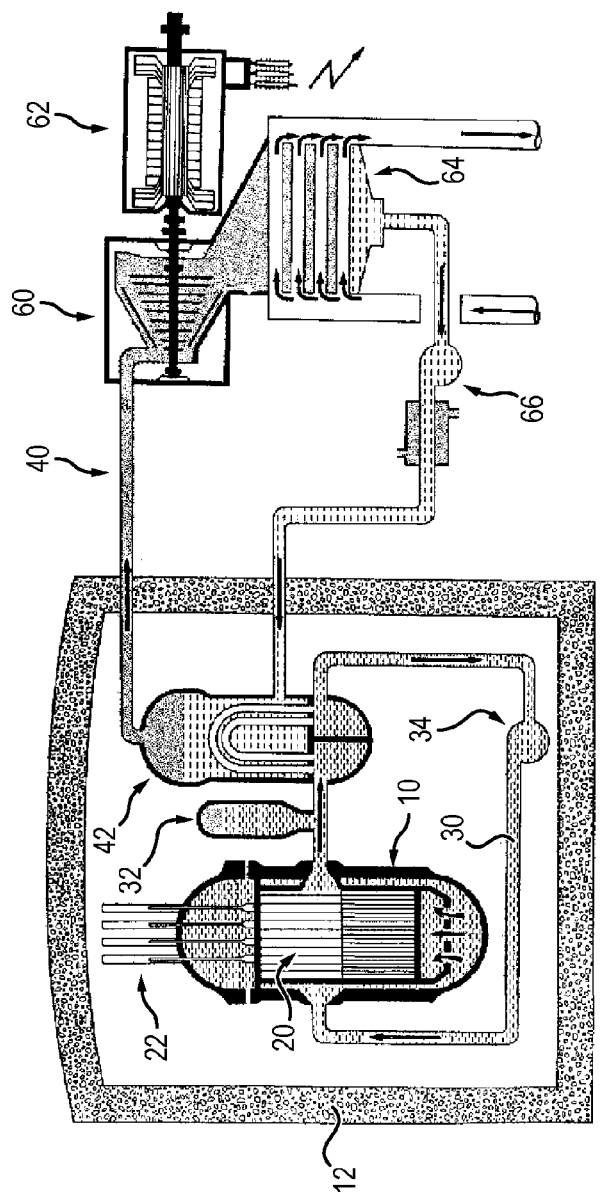
Figure 2:
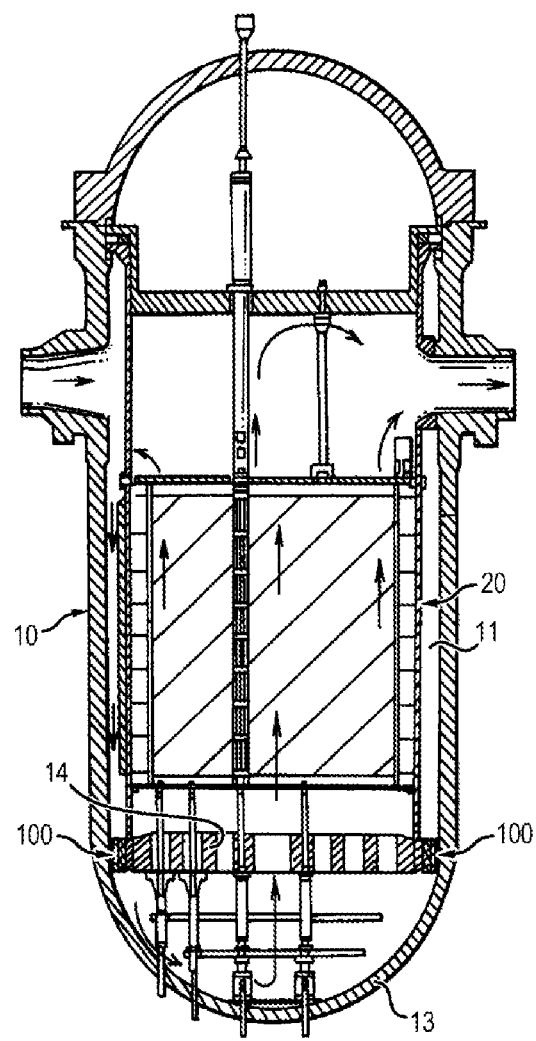
Figure 6:
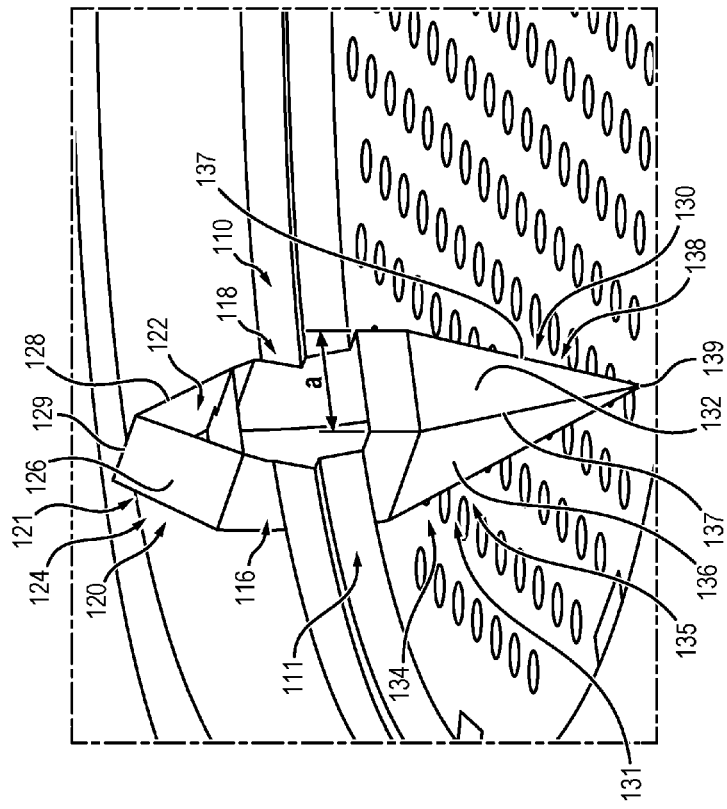
Figure 5:
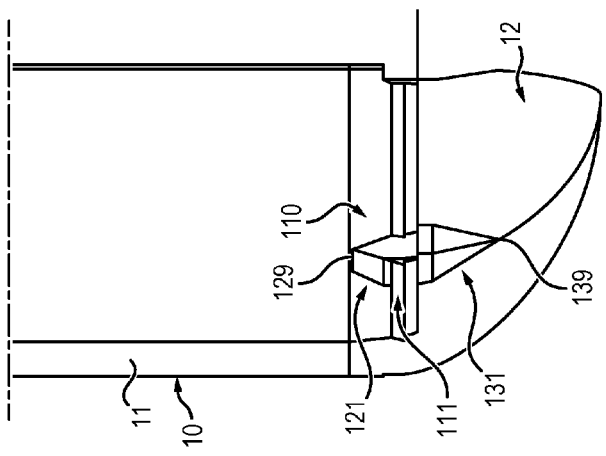
Figure 7:
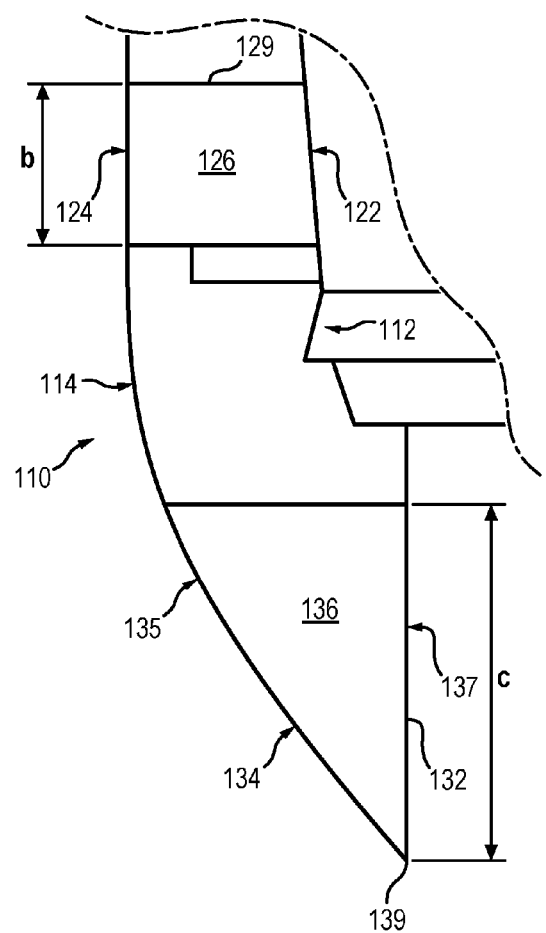

Other characteristics, objects and advantages of the present invention, will become apparent upon reading the following detailed description, and in relation to the appended drawings, given by way of non-limiting example and in which:

FIG. 1 previously described, represents a general view of a conventional nuclear power plant, FIG. 2 previously described, represents a schematic view in vertical section of a known nuclear power plant reactor, FIG. 3 previously described, represents a partial schematic view in vertical section of the lower part of a conventional reactor vessel, FIG. 4 previously described, represents a perspective view at an enlarged scale of a centering pin according to the state of the art, FIG. 5 represents a partial view in vertical section of a reactor vessel according to the present invention illustrating a pin according to the invention, FIG. 6 represents a perspective view similar to FIG. 4 of a pin according to the present invention, and FIG. 7 represents a view in vertical and radial section relative to the vertical central axis of the core, of a centering pin according to the invention.

DETAILED DESCRIPTION OF THE INVENTION

As indicated above, the general structure of a nuclear power plant is known to those skilled in the art. It will therefore not be described in detail.

It is simply recalled that the core is centered in the vessel by centering pins.

The appended FIGS. 5, 6 and 7 show a pin 110 according to the present invention.

More specifically, the pin 110 is defined by a radially inner axial face 112 adjacent to the core 20, which conforms to the shape of the core 20 at this level and which is generally stepped.

The pin 110 also includes a radially outer axial face 114 adjacent to the vessel 10 and which conforms to the shape of the vessel at this level. Thus, the face 114 is preferably curved. It converges toward the radially inner axial face 112 downwards.

The central part 111 of each pin 110 is completed with two radial faces 116, 118 generally planar and radial relative to the vertical central axis of the core.

As indicated above, according to the invention, each pin 110 is equipped with a hydrodynamic upper profile 120 and a hydrodynamic lower profile 130, disposed respectively above and below the central part 111.

The hydrodynamic upper profile 120 located upstream in the direction of flow of the fluid entering the annular space 11, has the shape of a dihedral 121.

More specifically, this dihedral 121 is formed of two symmetrical main facets 126, 128 which extend the radial faces 116 and 118 upwards. The facets 126, 128 are preferably generally flat and meet at a radial ridge 129 relative to the axis of the core.

The upper profile 120 is completed with two radially inner 122 and outer 124 secondary facets respectively adjacent to the outer face of the core and to the inner face of the vessel.

The lower hydrodynamic profile 130 has the general shape of a pyramid 131. It comprises two symmetrical main facets 136, 138 which extend the radial faces 116 and 118 downwards. The radially outer edges 135 of the main facets 136, 138 follow the contour of the vessel 10 and meet at the radially inner edge 137 at a point of convergence 139. The lower hydrodynamic profile 130 also comprises two radially inner 132 and outer 134 secondary facets. The radially outer 135 and radially inner 137 edges of the main facets 136, 138 converge to join the two secondary facets 132 and 134 of the pyramid 131 composing the lower profile, at the tip 139.

Of course, the present invention is not limited to the particular embodiment that has just been described, but extends to all variants according to its spirit.

Particularly, the hydrodynamic profiles 120 and 130 can be of angular or rounded geometry.

The best possible embodiment of a hydrodynamic device is a shape that eliminates any stagnation space (low-flow area) in the vicinity of the centering pins 110.

The present invention makes it possible to reduce or even totally eliminate turbulence at the bottom of the vessel.

The invention makes it possible to stabilize the flow on its passage at the centering pins 110 and therefore reduce the heterogeneity of the flow upstream of the core and thus make the distribution of the heat transfer fluid more homogeneous in the core.

FIG. 3 proposes an example of a pin 110 consisting of angular geometries. For this case, the pin 110 is defined by two parameters b and c.

The parameter b (illustrated in FIG. 7) corresponds to the vertical height of the upper profile 120.

The parameter c (illustrated in FIG. 7) corresponds to the vertical height of the lower profile 130.

These parameters b and c are defined in relation to the thickness a of the centering pin 110 (illustrated in FIG. 6) considered in a horizontal section and along the radially inner edge of the central part 111 of the pin 110.

In the example illustrated in FIGS. 5 to 7, the height b of the hydrodynamic upper part 120 of the pin 110 is in the same order of magnitude (0.87 times) as the thickness a of the centering pin 110. The height c of the hydrodynamic lower part 130 of the pin 110 is about twice (1.93 times) the thickness a of the centering pin 110.

This shape is chosen to make the centering pin 110 hydrodynamic for the water flowing down through the annular space 11. The centering pin 110 with the hydrodynamic devices 120 and 130 thus takes the shape of a wing. The upper part 120 of the pin 110 represents a leading edge of the wing and the lower part 130 represents a trailing edge of the wing.

The inventors have found that:

If the height b of the upper part 120 tends to zero, the device 120 has no more effect.

If the height b of the upper part 120 becomes too large, the device 120 blocks the rotation of water in the annular space 11. The rotation of water in the annular space is however significant because it mixes the water coming from the cold branches. This is an effect that stabilizes the circulation in the event of flow rate imbalance that may occur between cold branches. With the choice of a height b in the order of magnitude of the thickness a of the centering pin 110, an effective hydrodynamic shape is obtained without blocking the mixture in the annular space.

The height c of the lower part 130 of the device, in the order of twice the thickness a of the centering pin 110, is chosen so that the pin is extended vertically up to the bottom of the vessel.

The device is made less effective if it does not extend up to the bottom of the vessel.

The device 130 can induce space requirement and even a source of instability if it takes a larger shape that does not follow the vertical axis and approaches the center of the vessel.

Within the framework of the invention, it is meant by "same order of magnitude" a maximum variation of more or less 25% relative to a reference value.

The invention claimed is:

1. A centering pin for centering a nuclear reactor core of a nuclear power plant in a reactor vessel, comprising a central part having a radially inner edge oriented towards the nuclear reactor core and a horizontal thickness along the radially inner edge, an upper hydrodynamic profile, which is disposed above the central part and forms a vertical wing leading edge extending from the central part and having an upper height above the central part and defined between an upper end of the central part and an uppermost point of the upper hydrodynamic profile, and a lower hydrodynamic profile, which is disposed below the central part and forms a vertical wing trailing edge extending from the central part and having a lower height below the central part and defined between a lower end of the central part and a lowermost point of the lower hydrodynamic profile, wherein the upper height of the vertical wing leading edge of the upper hydrodynamic profile has a maximum variation of more or less 25% relative to the horizontal thickness of the central part, and wherein the lower height of the vertical wing trailing edge of the lower hydrodynamic profile has a maximum variation of more or less 25% relative to twice the horizontal thickness of the central part.

2. The centering pin according to claim 1, wherein the upper hydrodynamic profile has a shape of a dihedral.

3. The centering pin according to claim 1, wherein the lower hydrodynamic profile has a shape of a pyramid.

4. The centering pin according to claim 1, wherein the upper height of the vertical wing leading edge of the upper hydrodynamic profile is in an order of 0.87 times the horizontal thickness of the central part, while the lower height of the vertical wing trailing edge of the lower hydrodynamic profile is in the order of 1.93 times the horizontal thickness of the central part.

5. A nuclear power plant reactor comprising a reactor vessel, a nuclear reactor core and centering pins according to claim 1, wherein the nuclear reactor core is centered in the reactor vessel by the centering pins, wherein the radially inner edge of the central part of the centering pins is adjacent to the nuclear reactor core, wherein the central part of the centering pins has a radially outer axial face adjacent to the reactor vessel.

6. The nuclear power plant reactor of claim 5, comprising a cooling fluid circulating in a direction of flow in an annular space situated between the nuclear reactor core and the reactor vessel,
    wherein at least a part of the centering pins are situated in the annular space,
    wherein the upper hydrodynamic profile of the centering pins is located upstream in the direction of flow of the cooling fluid,
    wherein the lower hydrodynamic profile of the centering pins is located downstream in the direction of flow of the cooling fluid.

7. The nuclear power plant reactor of claim 6, wherein the lower hydrodynamic profile of the centering pins located downstream in the direction of flow of the cooling fluid reaches a bottom of the reactor vessel in a plenum of the reactor vessel.

* * * * *